(12) United States Patent
Bart

(10) Patent No.: US 6,681,683 B2
(45) Date of Patent: Jan. 27, 2004

(54) PANCAKE COOKING PAN WITH FLAT COOKING SURFACE

(75) Inventor: Philip D. Bart, Coconut Creek, FL (US)

(73) Assignee: Worldwide Inventions, Inc., Fort Lauderdale, FL (US)

( * ) Notice: Subject to any disclaimer, the term of this patent is extended or adjusted under 35 U.S.C. 154(b) by 0 days.

(21) Appl. No.: 10/371,486

(22) Filed: Feb. 22, 2003

(65) Prior Publication Data

US 2003/0196561 A1 Oct. 23, 2003

Related U.S. Application Data

(63) Continuation-in-part of application No. 10/261,525, filed on Sep. 30, 2002, now Pat. No. 6,550,374, which is a continuation-in-part of application No. 10/063,375, filed on Apr. 17, 2002, now Pat. No. 6,539,844.

(51) Int. Cl.[7] .............................. A47J 37/00; A47J 37/07
(52) U.S. Cl. ............................................ 99/424; 99/376
(58) Field of Search .................. 99/422–424, 372–382, 99/339, 340; 219/472, 521–524, 386, 533, 525; 220/4.22, 318, 526, 555, 844, 912; 126/9 R, 41 R

(56) References Cited

U.S. PATENT DOCUMENTS

| 740,050 A | 9/1903 | Shults |
| 1,987,594 A | 1/1935 | Chiles et al. |
| D119,081 S | 2/1940 | Weststrang |
| 4,176,593 A | 12/1979 | Terzian |
| D276,971 S | 1/1985 | Potts |
| 5,642,659 A | 7/1997 | Sesona et al. |
| 6,539,844 B1 * | 4/2003 | Bart .......................... 99/424 |

* cited by examiner

Primary Examiner—Timothy F. Simone
(74) Attorney, Agent, or Firm—Malin, Haley & DiMaggio, P.A.

(57) ABSTRACT

A pan for cooking pancakes or eggs that allows for cooking and removal of the finished, cooked food product without the need for a hand-held spatula. The cooking pan includes a first cooking container having three circular cooking wells for cooking three pancakes simultaneously that is joined by a hinge to a flat cooking body having parallel handles that allow the device to be rotated 180 degrees. during the cooking process. A movable spacer can hold the lid partially open to allow steam to escape during cooking.

15 Claims, 14 Drawing Sheets

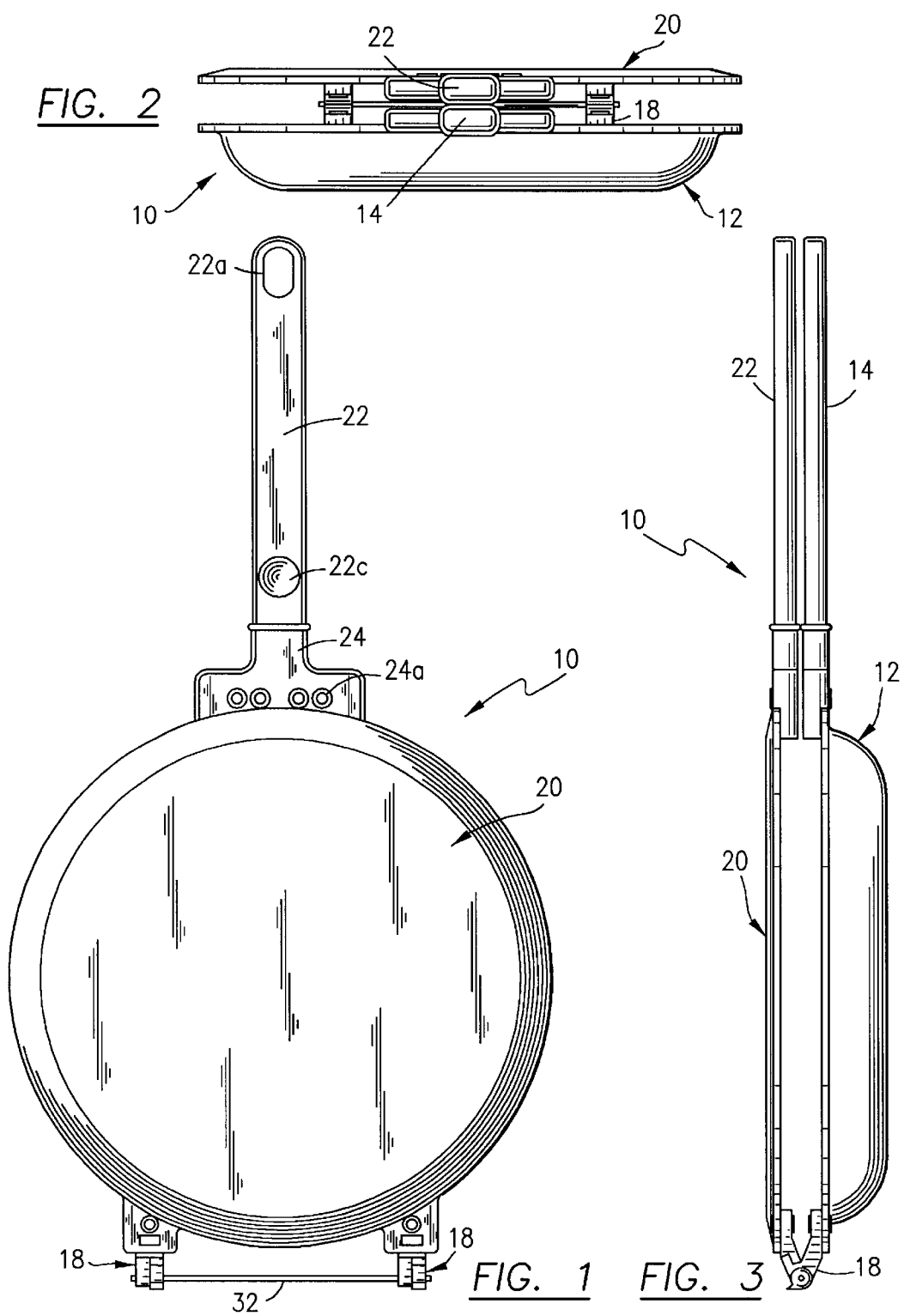

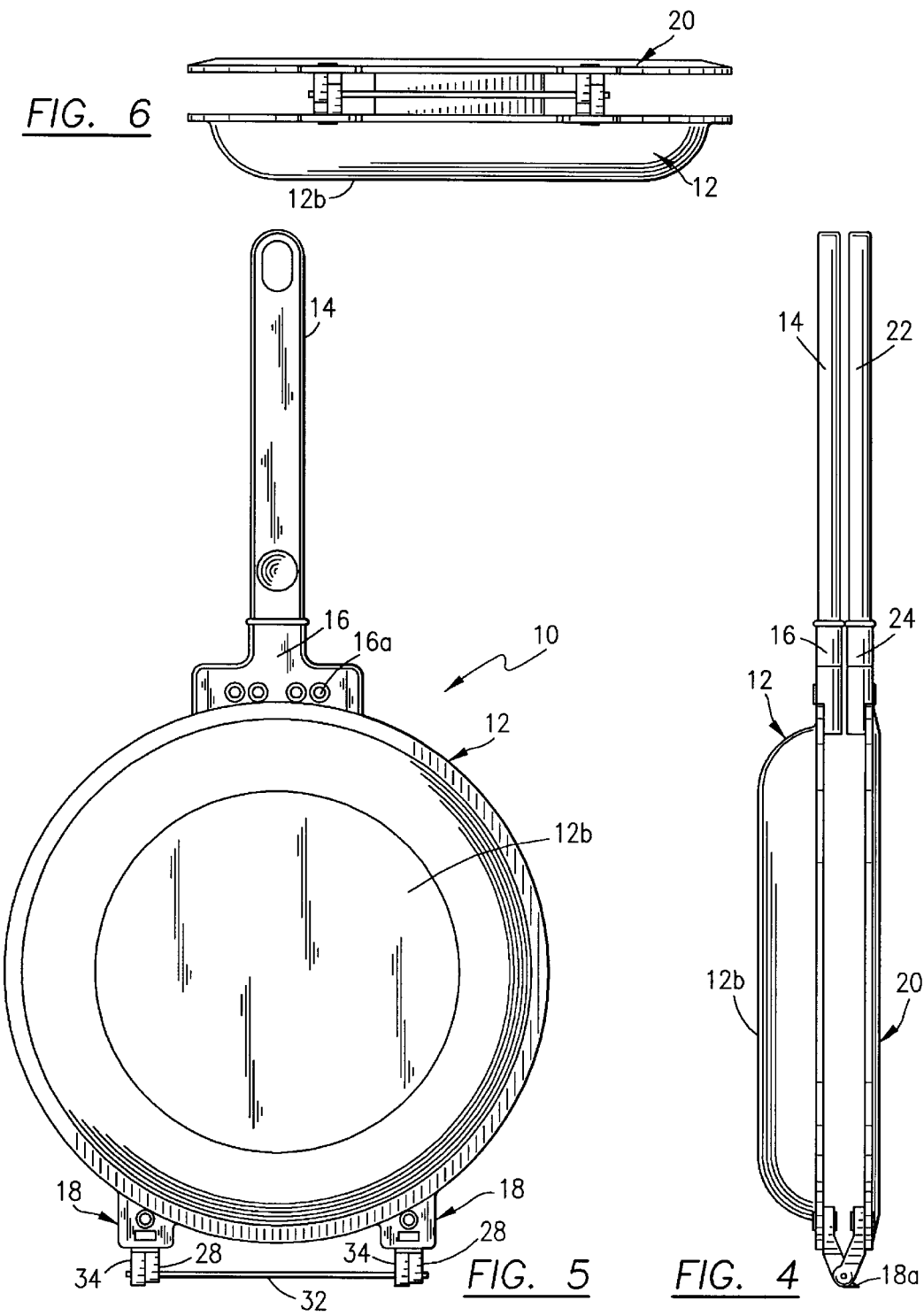

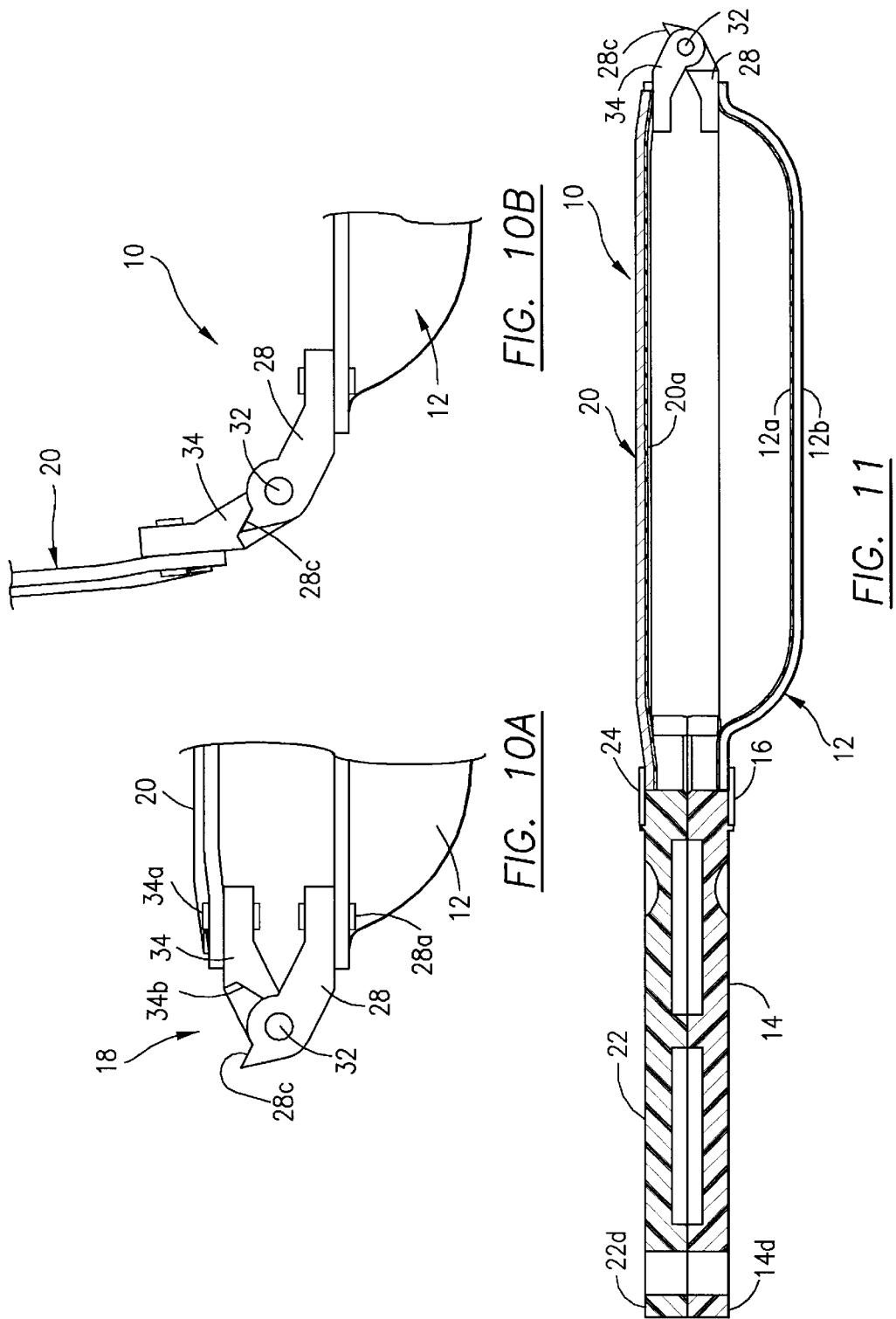

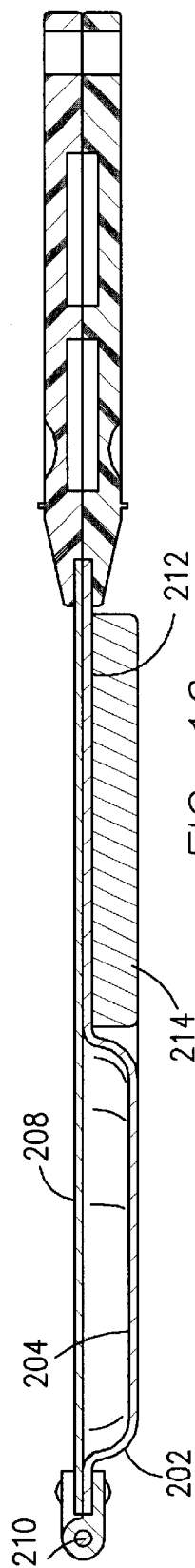
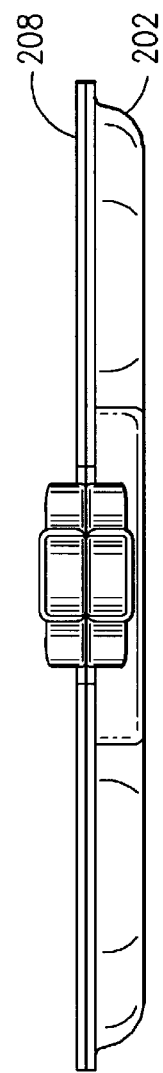
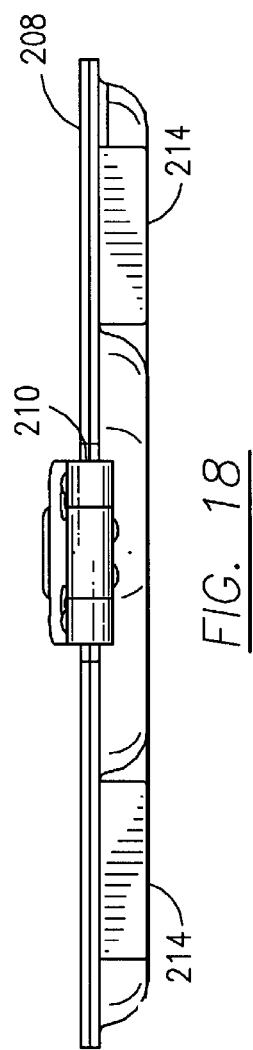
FIG. 16
FIG. 17
FIG. 18

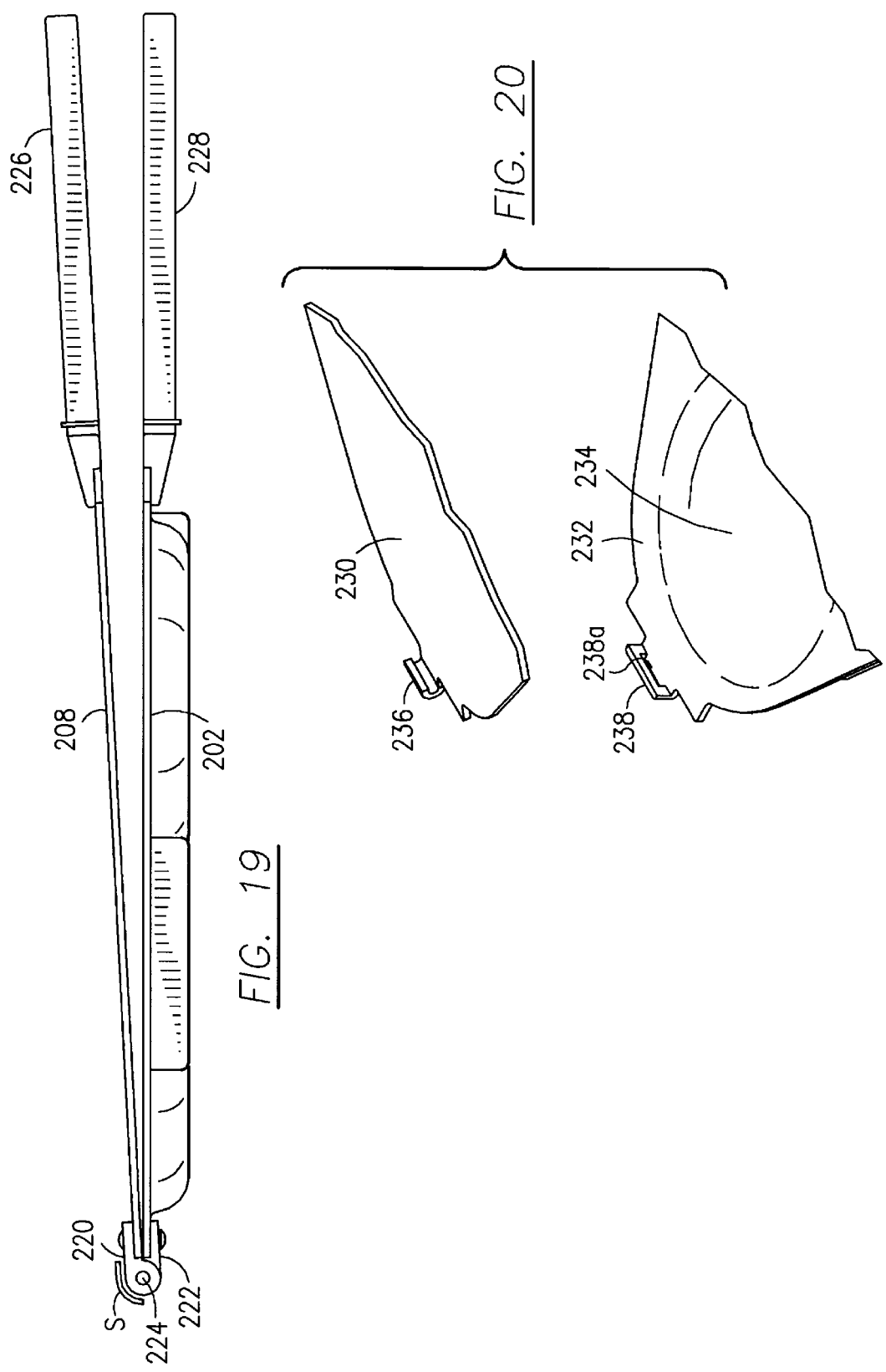

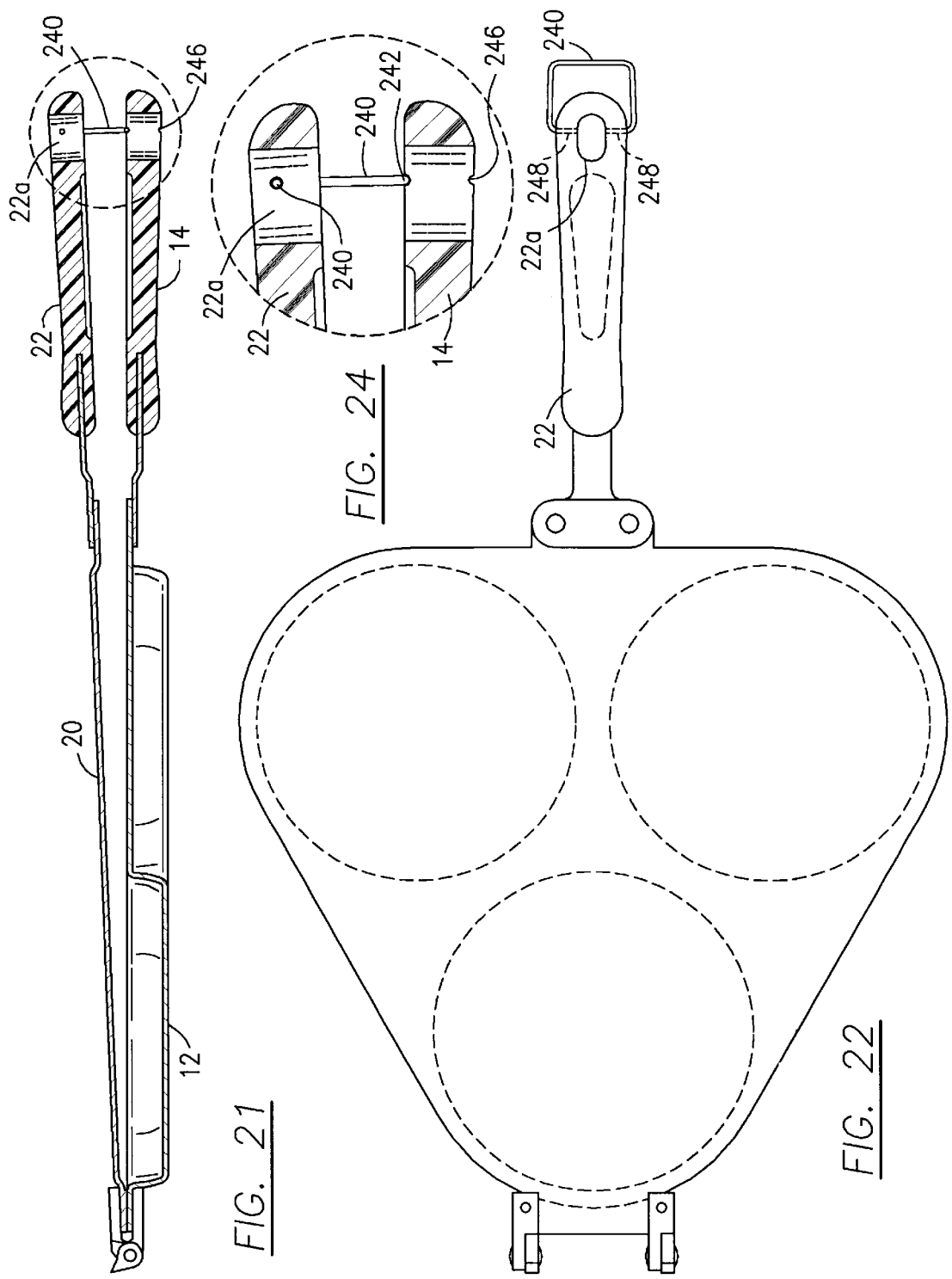

PANCAKE COOKING PAN WITH FLAT COOKING SURFACE

This application is a continuation-in-part of U.S. application Ser. No. 10/261,525, filed Sep. 30, 2002, now U.S. Pat. No. 6,550,374 which is a continuation-in-part of U.S. application Ser. No. 10/063,375, filed Apr. 17, 2002 now U.S. Pat. No. 6,539,844.

BACKGROUND OF THE INVENTION

1. Field of the Invention

This invention relates generally to a cooking pan for cooking pancakes and eggs on a conventional stove burner and specifically, to a pancake or egg pan in which the pan can be rotated 180 degrees during the cooking process such that the resultant food product can be easily served from the pan. Different foods, such as pancakes and eggs, can be cooked simultaneously in an alternate embodiment.

2. Description of the Prior Art

The cooking of liquid food products (such as pancakes and eggs) that start from a liquid batter and subsequently solidify during the cooking process traditionally require that during the cooking process, the cook use a hand-held spatula, that must be inserted carefully between the partially cooked food to turn over the food product so that the food can be cooked on both sides. Cooking pancakes or eggs requires constant monitoring of the pancake or egg liquid and some agility on the part of the cook in turning over the food with a spatula.

The second step required for cooking pancakes or eggs is that once the cooking is complete, the food product must be carefully removed with a spatula from the concave pan. Typically the spatula is manipulated under the food product, and carefully lifted out of the pan for deposit on a plate for serving. Often the food product is much larger than the spatula, providing an opportunity for the food product to break apart during transfer. Because of the concave nature of typical cooking pans, the cook must insert a spatula below the cooked material and carefully remove the material from the pan by moving the food over the concave side of the pan for serving the food. Often the pancake or egg is broken apart by the act of serving.

It is most important to have a high-quality cooking pan in which heat is transferred uniformly throughout the conductive heat surface. The use of iron skillets, aluminum, or copper pans is well known in the cooking of pancakes or eggs. Newer pans often include a non-slip coating on the top surface of the metal pan known under the trademark of Teflon. The pan cooking surfaces are coated to prevent sticking of eggs or pancake batter to the pan.

The prior art discloses several different approaches to the uniform cooking of pancakes, griddlecakes or eggs with an attempt to alleviate human intervention with a hand-held spatula to aid in the cooking process. U.S. Pat. No. 740,050 issued to Shults on Sep. 29, 1903 shows a griddle that includes two opposing concave cooking surfaces, hinged together on one side, with a pair of handles issuing from each concave cooking surface. Using this device, the cook lifts the pan, rotates and turns the food and uses the opposing pan to complete the cooking without the use of a hand-held spatula. One of the problems with this device is that both of the cooking surfaces are concave in nature so that one would still require a hand-held spatula to remove and serve the cooked product. U.S. Pat. No. 4,176,593 issued to Terzian issued on Dec. 4, 1979 shows a cooking device that has a self-contained heating unit (not a conventional stove burner) and a pair of concave cooking surfaces that are hinged together in which two pans are partially filled with egg batter or pancake mix and after an initial period, one half of the egg is turned on to the other half by rotating the pan about a central hinge. Again, both pans are concave and require a spatula for removing the cooked food product. U.S. Des. Pat. No. 119,081 issued on Feb. 20, 1940 to Weststrang shows a design patent for a cooking utensil with a pair of handles that include two concave cooking surfaces that are connected together, which apparently can be rotated. Again, both cooking surfaces are concave. U.S. Des. Pat. No. 276,971 issued Jan. 1, 1985 to Potts shows a skillet that includes two concave cooking surfaces joined together by a hinge with a pair of handles that are rectangular in shape. U.S. Pat. No. 1,987,594 issued Jan. 15, 1935 to Chiles, et al shows a reversible frying pan that also includes dividers for dividing foodstuff within the pan. Both halves of the cooking surface are concave so that the foodstuff must be removed carefully with a hand-held implement. U.S. Pat. No. 5,642,659 issued Jul. 1, 1997 to Sesona, et al shows a pancake and egg cooker that is self contained that includes a removable cooking concave surface that has a mold that has words embedded for making decorative designs in pancakes or eggs. The entire unit is self-contained and self heated and is not used on a stove.

The present invention overcomes the problems of the prior art by providing a cooking pan for cooking pancakes, eggs and other food articles that require turning over during cooking and that begin as a liquid and firm up to be a solid or partial solid when the cooking process has been completed.

The present invention provides for two heat-conductive cooking surfaces; one concave and the other flat; hinged together and having separate handles. The initial liquid is poured into the concave cooking surface. Once the cooked material solidifies sufficiently, the entire pan can be flipped 180 degrees. The cooked material now rests on the flat cooking surface until cooking is complete. The cooked food can than easily be removed and transferred to a plate by gravity without having to use a spatula.

In an alternate embodiment the pan bottom can include three separate concave pancake or egg walls to cook three pancakes at one time.

BRIEF SUMMARY OF THE INVENTION

A cooking pan for cooking pancakes, eggs, or other liquid foods that can be solidified and that require turning over during the cooking process, comprising a concave heat conductive container having a cooking surface that includes a protective non-stick coating on the concave cooking surface portion, a grasping handle connected to one edge of the concave cooking container at a predetermined location, a substantially flat, thin, heat-conductive body having a flat cooking surface attached by a pivotal hinge to the concave cooking container and sized in diameter to be approximately the same size as the concave cooking container and a second handle attached to said flat, heat-conductive cooking body. Both handles are made of a thermal insulating material and when the cooking unit is closed together, the handles are aligned together so that both handles can be grasped in one hand.

The cooking pan can be positioned in two modes, open and closed. The open mode has the concave container resting initially in the lower position, and the flat, disked shaped body hingeably positioned and open at least 90 degrees above the concave container. In this position, the foodstuff in liquid form would be poured into the concave container. The upper flat surface can then be closed relative to the concave container by moving the handles together in a closed position. The closed position 15 with both handles abutting each other and the concave container juxtaposed against the thin, flat body. This is the cooking position.

The concave cooking container is made of a uniform heat conductive material such as aluminum and shaped as a shallow, concave body with a central, circular area portion that is flat for resting on a stove burner. The container shape is circular and is sized to fit on a conventional burner on a stove burner that can be either gas or electric. The diameter of the concave cooking container depends on the size of the food product desired and can be manufactured in different sizes from small to large depending on the cooking environment required, whether at home or commercially. Some stoves have burners that are both large and small in diameter.

The flat cooking body is disk-shaped, flat and has a diameter that is substantially the same as that of the concave cooking container. The hinged joints are such to provide an opening between the concave surface and the flat surface when the two cooking surfaces are closed together. There can be approximately a one to two inch separation between the concave cooking surface base interior portion and the center of the flat cooking surface to see the food article while cooking.

Both pan cooking surfaces (concave and flat) employ a nonstick type of surface material (Teflon) on the outer layer (cooking portion) of the conductive metal such as aluminum, so that cooked food will not stick to either side of the pan.

To operate the invention, the pan is opened and the two cooking surfaces are separated with the two handles. The concave cooking body is placed upon the heating element of the stove. Liquid foodstuff such as pancake batter or an egg is added to the concave cooking container. The other half of the cooking pan is then rotated so that the handles are together and parallel. The flat cooking body is now on top and directly above the concave cooking container in a closed position. When sufficient cooking of the food has occurred, the cook rotates the cooking pan 180 degrees, grasping both handles together, placing the flat cooking container directly on the burner. The concave cooking container is now on top. Additional cooking may be accomplished but since the foodstuff has solidified during the initial cooking process, no liquid is ejected from the cooking utensil. Once the cooking process is complete, the upper cooking handle is then raised, exposing the cooked food resting on the flat body. The pan can be tilted, allowing the food product to slide off of the flat surface by gravity, eliminating the need for a spatula.

In an alternate embodiment, the pan hinge can include a separation spring to hold the upper flat surface and upper handle slightly above and away from the lower cooking pan to allow steal and moisture to escape during cooking. The handles can be manually squeezed together against the spray tension to cause contact between the upper flat surface and the pan during rotation of the pan.

In another alternate embodiment, the pan includes three separate concave cooking wells to permit cooking three pancakes or eggs or any combination simultaneously.

It is an object of this invention to provide an improved cooking pan, especially for liquids such as pancake batter or eggs that eliminates the use of spatulas during cooking and serving.

It is another object of this invention to provide a cooking pan for pancakes or eggs that at the completion of the cooking operation, the cooked foodstuff can slide from the pan without the use of hand-held spatulas.

It is another object of this invention to provide a cooking pan capable of cooking three separate or three individual items of the same foods simultaneously.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 1 shows a top plan view of the present invention in the closed position.

FIG. 2. shows an end elevational view in the direction of the handle ends in accordance with the present invention FIG. 3 shows a side elevational view of the present invention.

FIG. 4 shows a side elevational view of the present invention 180 degrees from the view shown in FIG. 3.

FIG. 5 shows a bottom plan view of the present invention.

FIG. 6 shows a front elevational view looking at the hinges of the present invention.

FIG. 10A shows a side elevational view partially cut away of the hinged structure used in the present invention in the closed position.

FIG. 10B shows a side elevational view partially cut away of the hinged structure used in the present invention in the opened position.

FIG. 11 shows a side elevational view of the present invention in cross section.

FIG. 16 shows a side elevational view of an alternative embodiment of the present invention that includes three separate concave portions on the concave cooking pan in a closed position.

FIG. 17 shows a front elevational view of an alternative embodiment of the present invention that includes three separate concave portions on the concave cooking pan in a closed position.

FIG. 18 shows an end elevational view facing the hinge of an alternate embodiment of the invention.

FIG. 19 shows a side elevational view of the preferred embodiment of the invention which could illustrate the pan during the cooking operation with the lid remaining partially open for cooking purposes to allow the escape of steam and moisture.

FIG. 20 shows an exploded cutaway view of yet another alternate embodiment of the invention having a different hinge fastener that connects the pan body to the upper flat surface.

FIG. 21 shows a side elevational view in cross section of an alternate embodiment having a spacer with the spacer holding the lid partially open.

FIG. 22 shows a top plan view of the alternate embodiment having a spacer shown in FIG. 21, with the spacer parallel to the upper handle.

FIG. 24 shows a cut away, side elevational detail view of the alternate embodiment. shown in FIG. 21 having a spacer holding the lid partially open.

PREFERRED EMBODIMENT OF THE INVENTION

Figure 7:
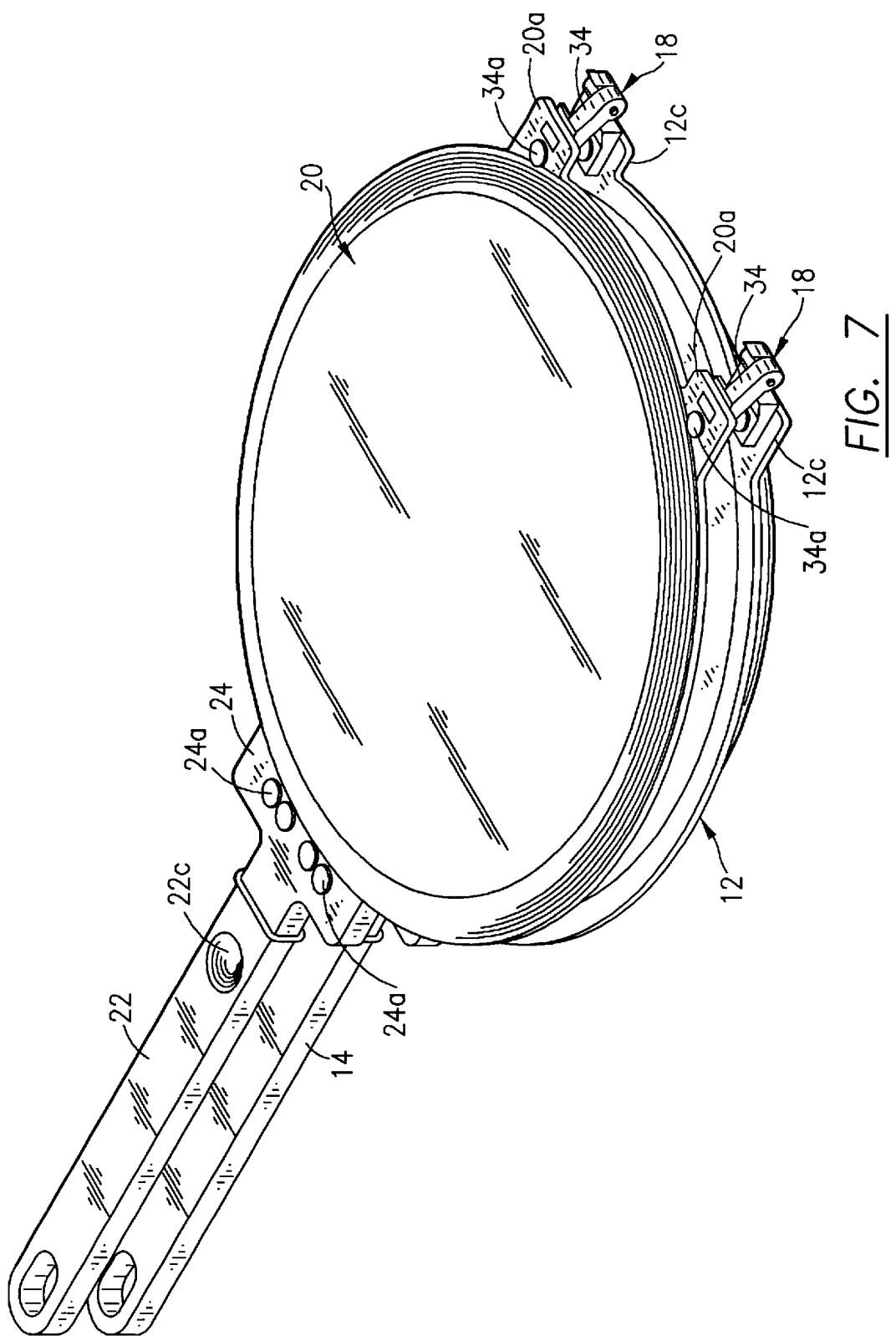
FIG. 7. shows a perspective of the present invention in the closed position.

Referring now to the drawings and in particular FIG. 1, the present invention is shown generally at 10 as a cooking pan that includes a flat, thin, circular, disk shaped body 20 which is made of a heat conductive metal such as aluminum that includes a handle fastener 24 that is a metal fastener attached to flat body 20 by a plurality of rivets 24a, that also attach a thermally insulative material 22 such as a plastic handle to fastener 24. The handle 22 includes a hemispherically-shaped concave thumb recess 22c for convenience in grasping handle 22 so that the user can put a thumb against and in the concave recess 22c. A pair of hinges 18 is attached on one side to thin body 20. The hinges are joined together by an elongated rigid rod 32. The upper handle 22 includes an opening for aperture 22a for hanging on a hook when the pan is not in use. FIG. 2 and FIG. 3 each show the pan 10 in the closed position and including a lower concave cooking container 12 that is circular and has a handle 14 attached thereto. As shown handles 22 and 14 are parallel and in contact in the closed position as shown in FIG. 2 and FIG. 3. The closed position as shown in FIGS. 2 and 3 is the cooking position.

FIG. 4 is a mirror image of the side elevational view shown in FIG. 3 from the opposite side.

FIG. 5 shows a top plan view of the concave cooking container 12 which has a bottom somewhat flat circular area 12b in the center which abuts a stove burner during the cooking process to keep the entire pan level. Handle 14, which is a thermal. insulating plastic is attached to container 12 by a metal fastener 16 that attaches handle 14 to container 12 by rivets 16a.

As shown in FIG. 5 hinges 18 include hinge brackets 34 and hinge brackets 28 which are explained in further detail later, joined by bar 32.

FIG. 7 shows the device including metal tabs 20a which are integrally formed with flat body 20 that allow hinge bracket 34 to be attached to tab 20a by rivets 34a. The hinges 18 are openly exposed and extend outwardly to allow for easy cleaning and include a hinge stop in the open position described below. Note that the handle 22 is attached to fastener 24 by a plurality of rivets 24a.

Figure 8:
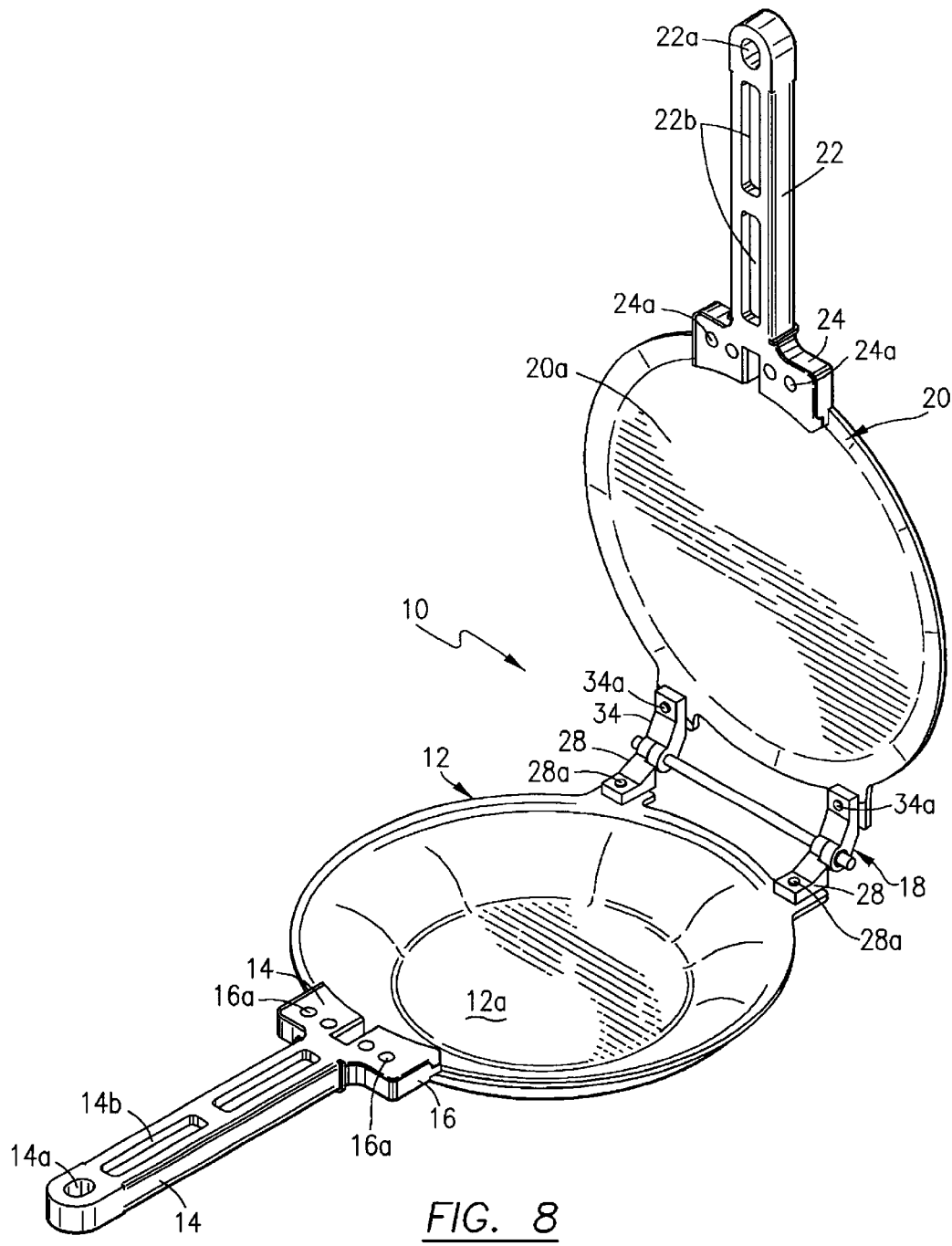
FIG. 8 shows a perspective view of the present invention in an opened position with the concave container on the lower side.

Referring now to FIG. 8, the cooking pan 10 is shown in the open position with the upper flat body 20 moved substantially greater than 90 degrees relative to concave container 12. The concave container 12 includes a non-stick coating 12a that is permanently attached to the metal heat conductive body 12 on the upper surface to prevent foods from becoming stuck within the concave container 12 during cooking. A similar coating material 20a is permanently attached to the thin body 20 for the same purposes. Such a material in one instance is known under the trade name of Teflon.

FIG. 8 also shows the connection of handle 14 which includes recessed portions 14b in the thermal conductive plastic 14 for strength and weight reduction. The handle 14 also includes an aperture 14a that abuts to aperture 22a and therefore allows for the hanging of cooking plan 10 for storage The thermal plastic 14 includes being molded into fastener 16 which has a metal wall connected directly to the container 12 through rivets 16a along with handle 14. Hidden beneath fastener 16 metal portion and the plastic 14 of the handle is a tab that forms part of the structure of concave container 12 that allows the handle 14 and the fastener 16 to be attached to concave container 12 by the rivets 16a. A similar construction is accomplished between the flat body 20, handle 22, fastener 24 and rivets 24a. The handle 22 also includes recessed portions 22b in the thermal conductive handle 22.

The hinges 18 include hinge brackets 28 which are affixed to concave pan 12 by rivets 28a.

Flat body 20 is connected to hinge brackets 34 through rivets 34a. The metal bar allows the two rivet brackets 28 and 34 to pivot along the entire upper, flat body 20 and handle 22 can be moved between the opened position that is shown in FIG. 8 and a closed position as is shown in FIG. 7.

As shown in FIG. 8, this would be the initial posture of the pan 10 when the cooking process is commenced. The pancake batter or egg would be poured into the concave cooking container 12 and the upper flat body 20 moved to a closed position.

Figure 9:
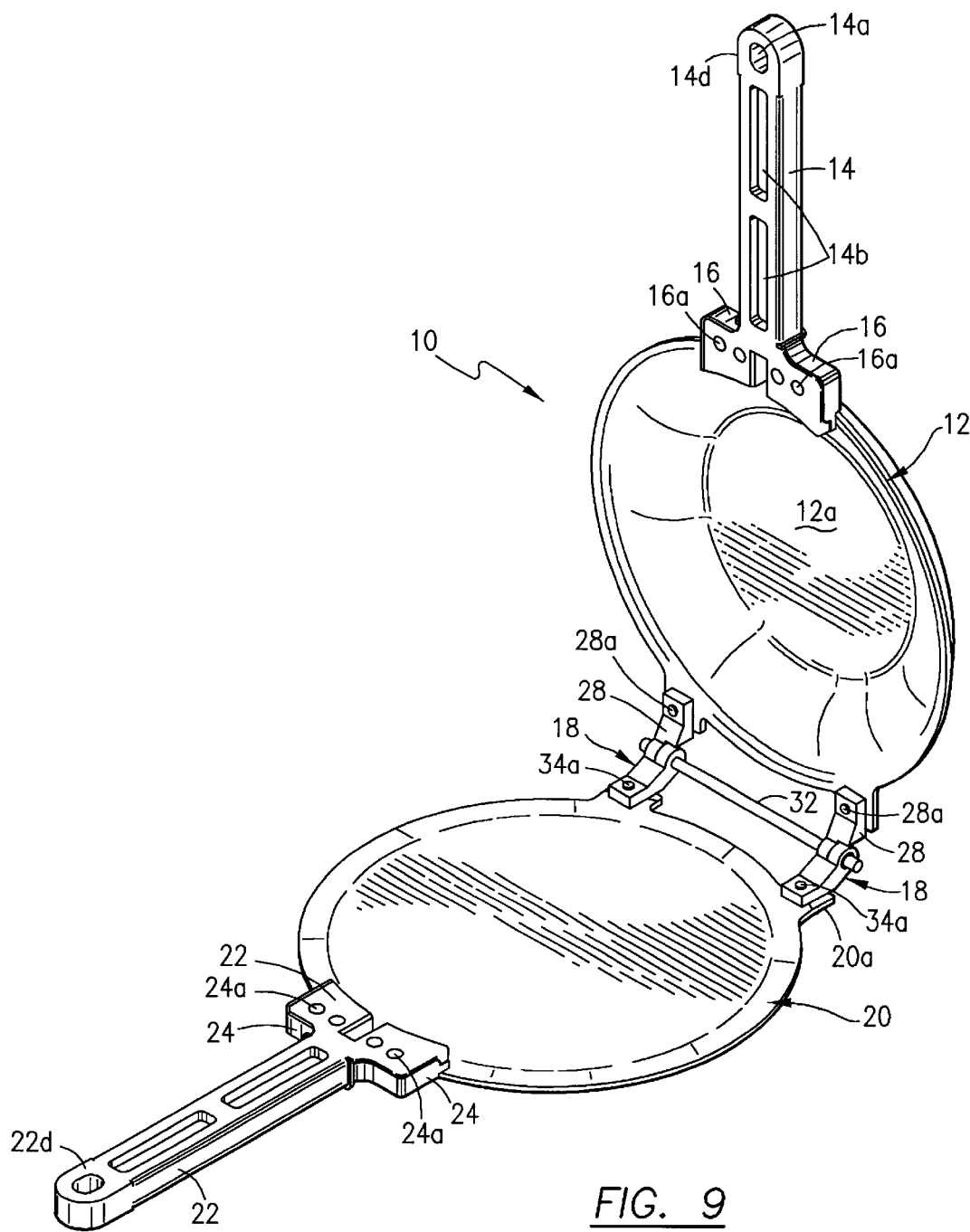
FIG. 9 shows a perspective view of the present invention with the flat body in the lower position such as for serving the cooked food stuff.

During the cooking process, the entire pan is rotated 180 degrees manually turning over the foodstuff to the opposite side. At that point in time, as is shown in FIG. 9, the flat, thin body 20 would be below concave container 12 and flat body 20 would be resting on the burner. The cooking process can then be completed in the closed position. Once the cooking is complete, the upper portion can be raised.

The end tips of handles 14 and 22 include (on the inside portion face) slightly raised end portions 14d and 22d which allow handle separation in the closed position.

One of the important features of the invention, as shown in FIG. 9, is removal and serving of the final cooked food product from the pan. Once can move the entire pan 10 to the serving area and in the position as shown in FIG. 9, merely tilt the lower flat surface 20 over the serving plate and the food stuff will slide off by gravity. There is no concave surface to get in the way of removing the foodstuff. A spatula is not needed to remove the foodstuff from the surface of thin body 20.

Referring now to FIGS. 10A and 10B, the hinges 18 are shown such that hinge bracket 28 is connected by rod 32 through hinge bracket 34. Note the flat surface 28c protruding from hinge bracket 28 which is effectively a stop, that engages flat portion 34b when the flat surface 20 is in the open position relative to concave container 12 as shown in FIG. 10B. Rivets 34a and 28a connect the hinge bracket 34 to container 20. Thus, in the open position as shown in FIG. 10B, the upper cooking thin body 20 can rest in an approximately slightly greater than 90 degree position such that the entire pan 10 is stable.

FIG. 11 shows the concave nature of the pan 10 such that concave container 12 including coating 12a is suitable for cooking especially initially with the liquid. The lower area 12b is flat to rest on a stove burner uniformly. FIG. 11A shows the closed position.

In operation of the device, referring back to FIG. 8, the cooking pan 10 would be placed on a gas or electric burner of a stove and pancake batter or egg liquid material poured into the concave cooking container 12. The flat cooking body 20 with handle 22 would then be closed so that the flat body 20 is parallel to the concave container 12 (FIG. 7). There is a sufficient space between the body 20 and the container 12 that allows the cook to observe the food material perimeter for bubbles during cooking. At some stage during the cooking process, when sufficient cooking of the food has occurred, the handles 14 and 22 are grasped and the entire pan is then rotated 180 degrees, with the flat cooking body 20 being placed upon a stove burner (not shown) to complete the cooking process. When the cooking process has been completed, the concave cooking container 12 can be lifted by handle 14 to a position (FIG. 9) so that the completely cooked food product can be easily retrieved from the flat cooking body 20. The food removal can be accomplished by tilting the flat cooking body 20 with the food above a plate, so that the food can then slide off by gravity, since the lower cooking body 20 is flat and has a non-stick surface. This eliminates the need for a hand-held spatula to scoop out the final cooked product.

Figure 12A:
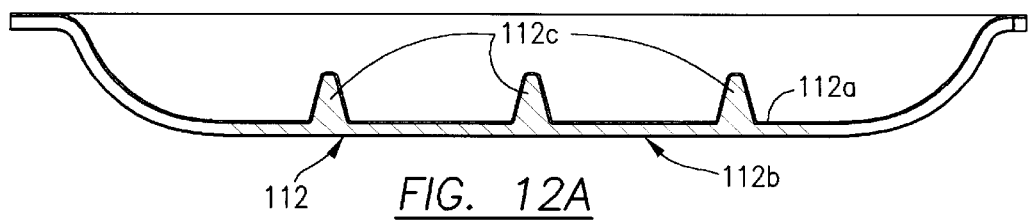
FIG. 12A shows a side elevational view in cross section, partially cut away of the concave cooking pan as an alternate embodiment that includes a plurality of food engaging conical truncated projections to prevent food from moving sideways during the rotation of the pan.
Figure 12B:
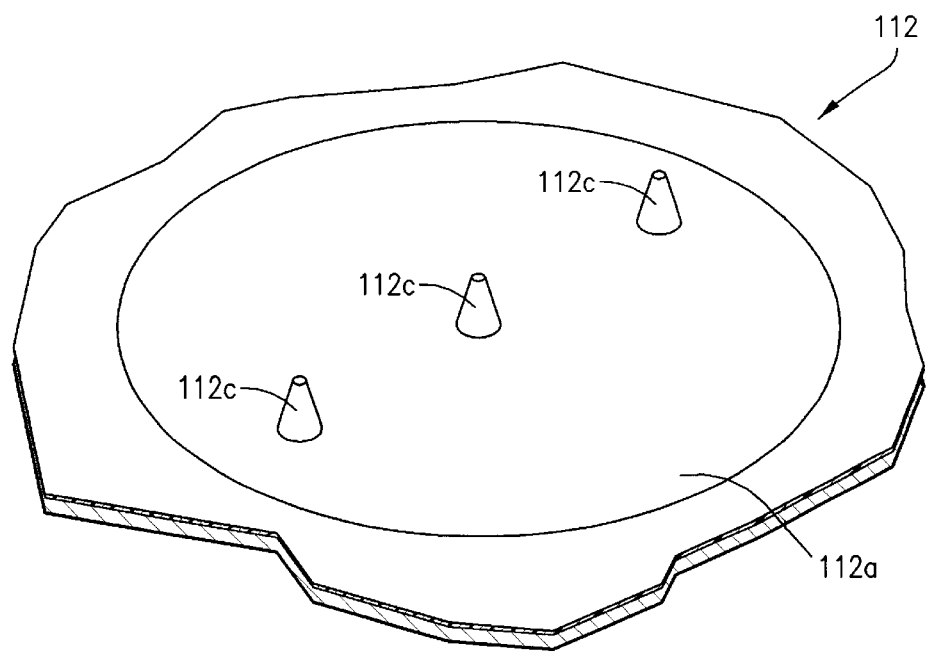
FIG. 12B shows a partially cut away perspective view of the inside cooking surface of the alternate embodiment of the concave cooking pan shown in FIG. 12A.
Figure 13:
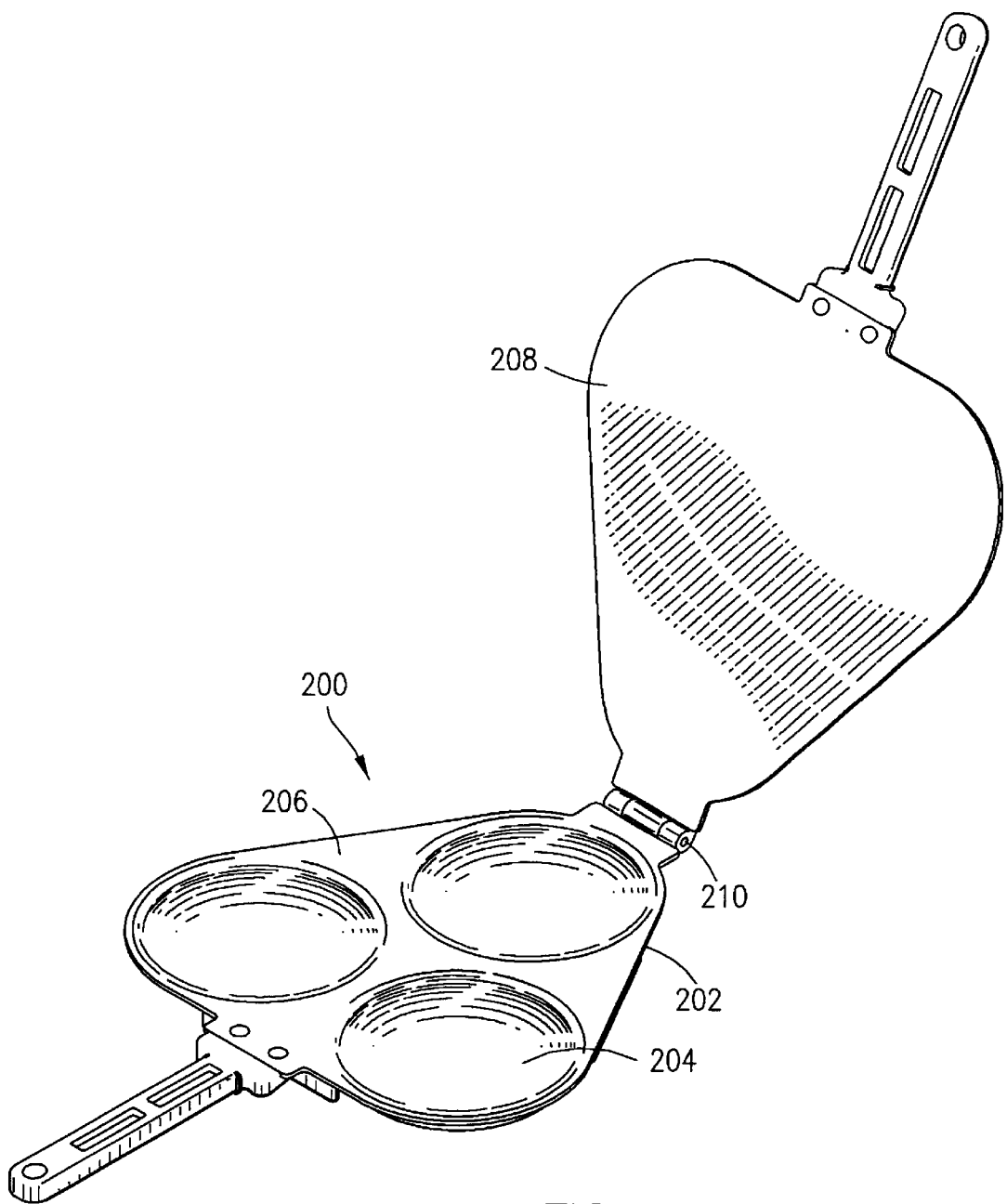
FIG. 13 shows a perspective view of an alternative embodiment of the present invention that includes three separate concave portions on the concave cooking pan in an opened position with the three concave portions on the lower side.
Figure 14:
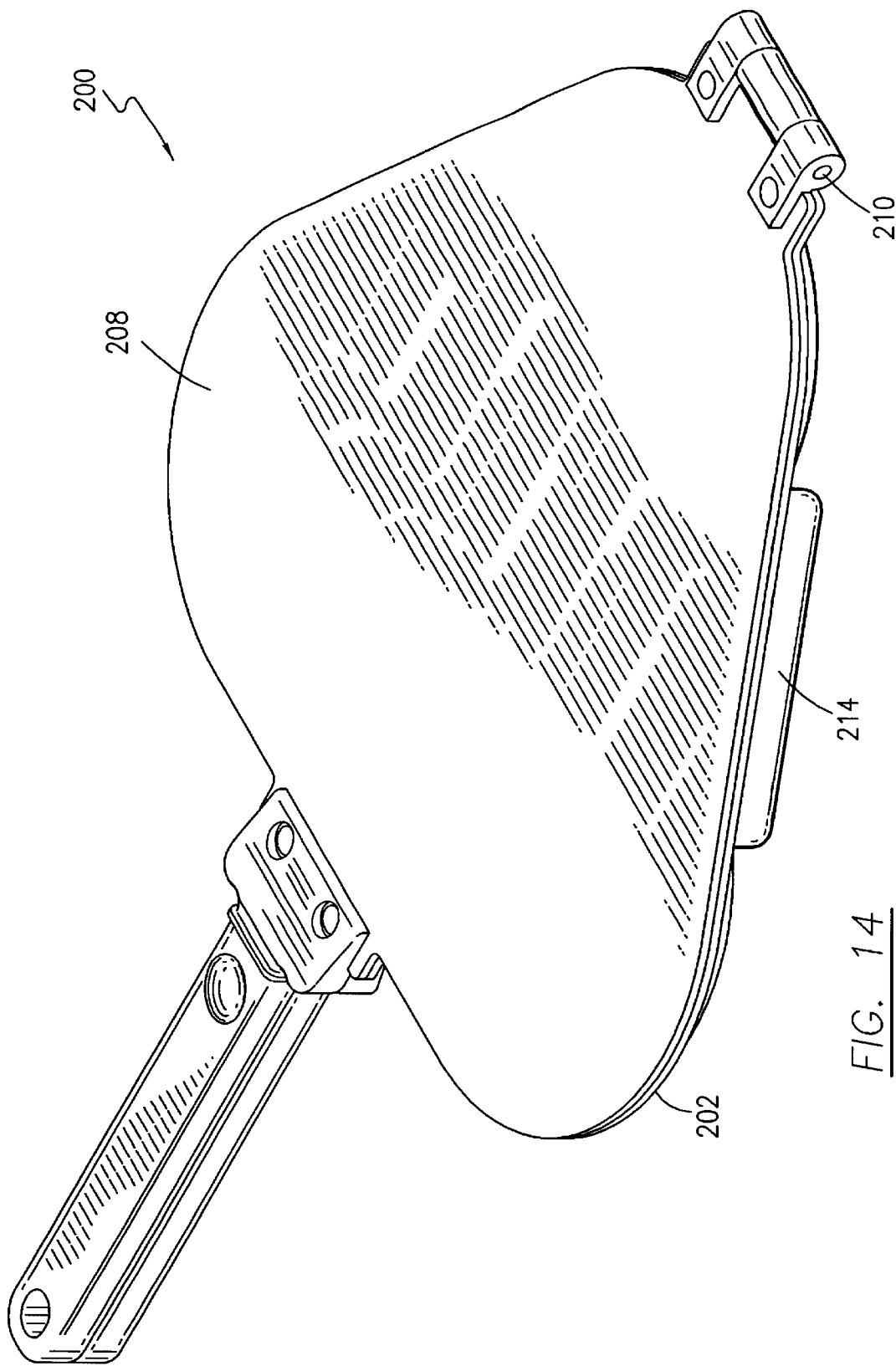
FIG. 14 shows a perspective view of an alternative embodiment of the present invention that includes three separate concave portions on the concave cooking pan in a closed position with the three concave portions on the lower side.

Referring now to FIGS. 12A and 12B, an alternate embodiment of the present invention is shown. Specifically, the concave cooking pan body 112 includes a Teflon coating 112a on the top inner surface to prevent sticking. The bottom area 112b is substantially flat in the center portion so that the pan can sit stably on a conventional burner. Also included are three truncated, conical projections which may be formed with the original aluminum cooking pan body 112 or that could be spot welded as truncated cones to the upper cooking surface of body 112. The purpose of the truncated conical projections is to become embedded in the cooking food such as a pancake, to prevent lateral movement of the pancake while the pan is being rotated 180 degrees. This prevents any lateral or sideways movement so that the pancake doesn't come out of the pan while the pan is inverted. FIG. 12B shows a plurality of small, truncated cones 112c. The height of each projection 112c could be approximately half the distance from the base of the pan to a plane intersecting the top rim of the pan. However, the projections could be slightly smaller or slightly larger. As shown in FIG. 12B the projections 112c are such that the food stuff will cook around it and that the projections 112c will be embedded in the food while it is cooking, preventing lateral movement. The projections would also include a Teflon coating 112a to prevent sticking. Once the pan is inverted so that the flat cooking surface supports the food stuff, the food connected to the projections 112c will fall by gravity to the lower surface and will no longer engage the projections 112c. Note that the cooking pan could also have a rest position, or a cooking position, in which the lower cooking pan is separated slightly an angularly from the upper flat surface by putting a spring at the hinge joint to permit some type of small angular relationship. This permits steam and other liquids to pass out of the pan during the cooking operation and also prevents pressure buildup within the cooking area. Manually squeezing the handles together would cause the two handles, the upper surface and the cooking pan, to be in contact for the rotation or flipping operation when the pan is turned over so that liquids could not escape from the pan. Such an embodiment is shown in FIG. 19.

FIGS. 13 through 17 show yet another alternative embodiment of the invention. This embodiment is a cooking pan capable of cooking simultaneously three food items such as pancakes, eggs or eggs, shown generally at 200. In the lower cooking body 202 are at least three concave food contact sections or wells 204, each of suitable size for said pancakes, eggs or eggs. Preferably, the surface of the sections 204 are made from or covered with a non-stick material. The interior surface 206 of lower cooking body 202 around the concave sections 204 is generally level. A flat top portion 208 is attached to the lower cooking portion 202 by hinges 210, as shown in FIGS. 13 through 17. Alternative fastener for attaching the flat top portion with the lower cooking body may be used, such as a tab and hole mechanism or interlocking complementary projections. The attachment may be permanent or releasable. When the cooking pan 200 is closed, the top portion 208 fits generally flush against the interior surface 206 of the lower body 202, as shown in FIGS. 14 through 17. The top portion 208 may be either slightly concave or generally flat, so long as the contact is flush with the lower portion 202. As shown, the lower body 202 and the top portion 208 are generally triangular in shape. However, they may be of any geometric shape, such as circular or rectangular.

Figure 15:
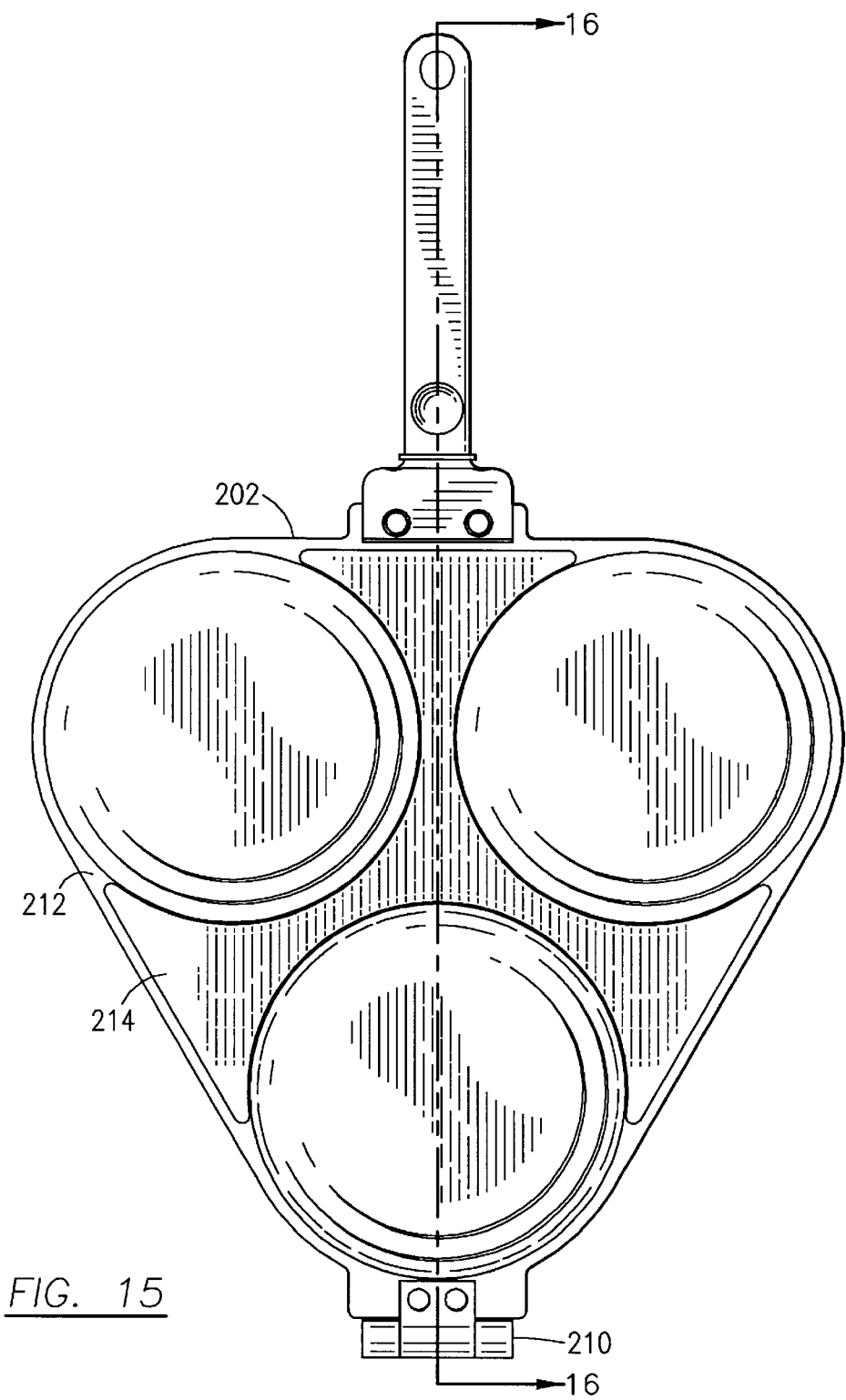
FIG. 15 shows a bottom plan view of an alternative embodiment of the present invention that includes three separate concave portions on the concave cooking pan in a closed position.
Figure 23:
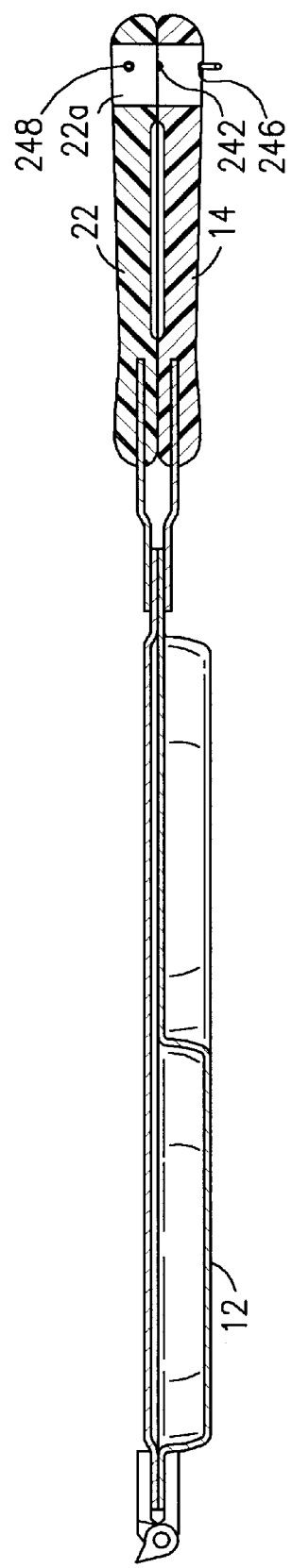
FIG. 23 shows a side elevational view in cross section of the alternate embodiment having a spacer shown in FIG. 21 with the spacer holding an upper handle against a lower handle.

In addition, as shown in FIGS. 15 through 17, a heat sink 214 is attached to the bottom area 212 of the lower cooking portion 202. The heat sink 214 enables the uniform distribution of heat across the pan bottom from a conventional stove burner, electric or gas, to compensate for the convex well 204 areas on the pan bottom. The heat sink 214 is preferably made out of a material such as stainless steel or aluminum, although other is material for conducting heat may be used. As shown, when there are three food contact sections 204, a singular, triangular heat sink 214 is preferred. However, other configurations for a heat sink 214 known in the art may be used. The total bottom area of the pan thus appears flat when viewed from the bottom, even though the pan inside has three separate concave cooking wells, approximately five inches in diameter. Each pan cooking well is approximately one inch deep and can cook eggs, pancakes, potatoes or other foods in individual wells simultaneously. The lid fits snuggly against each well 204 to prepare food from spilling out of each well 204 when the pan is flipped.

FIG. 18 shows an end view showing the hinge pin 210 with the lid 208 flush with the top of the cooking pan 214.

Referring now to FIG. 19, the preferred disposition of the multiple pancake and egg pan is shown in a rest position. The pan 202 is slightly spaced away from lid 208 in an angular disposition so that handles 226 and 228 are separated in the rest position. This is accomplished by having a hinge 220 that is connected to the lid 208 and a second hinge member 222 that is connected to the pan 202 and a hinge pin 204 that are shaped in size and thickness and connected to spring 5 to permit an angle to be formed between the lid 208 and the pan 202 when the unit is at rest such as on a stove top while cooking. The purpose of having the flat pan lid 208 open during cooking is to ensure that steam vapor can escape from the cooking areas inside the pan during the normal course of cooking. This would alleviate any pressure build up from the food wells in the pan 202. Note however that the way the hinge joint 220 and 222 are made with the spring 5 and spring action, squeezing the handles manually 226 and 228 together will cause the lid 208 to be flush with the cooking wells and the top surface 208 against pan 202 such that during rotation of the pan, none of the liquid material such as pancake or egg will flow out into other compartments during the rotation manual action. When the unit is cooking on the lid side 208, at that stage the food stuff will be cooked sufficiently the foods will not flow.

Referring now to FIG. 20, a modified, different hinge connector for connecting the pan 232 to lid 230 is shown. The lid 230 has a C-shaped connector 236 disposed at the end of the upper lid 230. The pan 232 includes a food well 234 for pancakes or eggs and includes a rigid bar welded or formed as part of pan 232 that has an elongated slot 238a that is sized in thickness and length to receive the C-shaped member 236 shown as part of lid 230. When the lid 230 is attached to pan 232, and the C-shaped fastener 236 is in place in slot 238a, and the configuration is at rest, it will look like the configuration in FIG. 19 as far as providing a predetermined opening or angular relationship with the lid 208 and the pan 202. The fastener and connector 236 and 238 shown in FIG. 20 also allow the two cooking elements such as pan 232 and lid 230 to be disconnected from each other for cleaning purposes or storage.

FIGS. 21 and 22 show an alternate embodiment of the pan having a spacer 240 pivotally connected to upper lid handle 22 near the end portion of handle 22. This embodiment is especially preferred for the apparatus having three wells for cooking in the pan portion, because the spacer 240 holds the lid 20 partially open during cooking to let steam escape. When the lid 20 is thus held open, cooking performance for certain foods in the pan 12 is improved. As shown in FIGS. 21 through 24, the spacer 240 is movably attached to the lid handle 22 on each side wall forming aperture 22a. As detailed in FIG. 24, the top surface of the bottom handle 14 has a depression 242 or other adaptation to stabilize the spacer when the lid is propped open. Also, as shown in FIGS. 21 and 24, the bottom surface of the bottom handle 14 has a curved depression 246 to hold the spacer 240 in place when the lid 20 is closed against pan 12. and the handles 12 and 14 are engaged.

The spacer 240 is preferably formed by the moveable attachment of a generally square shaped rigid wire having ends lodged in passages 248 orthogonal with the top handle 22 formed into the top handle 22. The spacer 240 is preferably held in place within the passages 248 by the rigidity of the material forming the spacer 240. The spacer 240 is made of a metal such as steel or aluminum. However, the spacer 240 may also be made of rigid plastic or similar material. Also, the spacer may be moveably attached to the handle in other ways known in the art.

In an alternative embodiment not shown, the spacer 240 may be moveably attached to the bottom handle, and the corresponding depressions for use with the spacer 240 may be formed in the top handle 14.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cooking pan for cooking food such as pancakes and eggs that begin in liquid form and then are solidified during the cooking process, comprising;

a concave cooking container made of a heat conductive material that includes a circular body having three concave cooking wells;

a first thermally insulative handle connected to one edge of said concave cooking container;

a flat disk-shaped cooking body;

a second thermally insulative handle connected to one edge of said flat cooking body;

a hinge connecting said concave cooking container to said flat disk-shaped cooking body along one edge; and a spacer connected to said second handle for engaging said first handle to hold said first handle above said second handle to allow steam to escape during cooking.

2. A device as in claim 1 wherein said flat cooking body is thermally conductive and includes a cooking surface coating that provides a non-stick cooking surface; and said concave cooking container including a non-stick coating to prevent foods from sticking while cooking.

3. A cooking device as in claim 1, wherein said first handle and second handle are made of thermally insulative materials to reduce heat conductivity and are shaped to fit together in the closed position adjacent each other, said handles being mounted by a pair of tabs firmly attached to the concave cooking surface and the flat cooking surface.

4. A device as in claim 1, including:

said concave cooking container including at least one vertical projection connected to the upper cooking surface of said concave cooking container substantial in height so that it will prevent lateral movement of food being cooking within the concave cooking container.

5. A device as in claim 4, including:

said concave cooking container upper surface projection being substantially a truncated, conical member.

6. A cooking pan for cooking food such as pancakes and eggs that begin in liquid form and then are solidified during the cooking process, comprising;

a concave cooking container made of a heat conductive material that includes a lower body that has at least three concave food contact portions;

a first thermally insulative handle connected to one edge of said lower body;

a flat cooking body;

a second thermally insulative handle connected to one edge of said flat cooking body;

a hinge connecting said lower body to said flat cooking body along one edge, said hinge providing generally flush orientation between said lower body and said flat cooking body in a closed position for cooking; and a means for spacing said second handle from said first handle connected to said second handle.

7. The cooking pan of claim 6, further comprising a heat sink attached to a bottom surface of the lower body.

8. The cooking pan of claim 7, wherein said heat sink is intrinsic to said bottom surface.

9. A cooking pan as in claim 6, including:

said hinge having a C-shaped member on said flat cooking body and a protruding bar having a slot and a protruding bar having a slot connected to said concave cooking container whereby said C-shaped member and said bar having said slot can be joined together as a hinge for connecting the cooking body to said cooking container.

10. A cooking pan as in claim 6, including:

means for spacing the first handle from the second handle moveably attached to the first handle.

11. The pan as in claim 6, wherein the means for spacing further comprises means for securing the first handle against the second handle while the pan is in use.

12. The pan as in claim 6, wherein the means for spacing comprises:

a spacer located on the first handle; and a depression complementary to the spacer located on the top surface of the second handle.

13. The pan as in claim 11, wherein the means for securing comprises:

a depression complementary to the spacer located on the bottom surface of the second handle.

14. The pan as in claim 10, wherein the means for spacing comprises a generally square member moveably attached to the first handle.

15. The pan as in claim 10, wherein the means for spacing comprises a generally square member moveably attached to the second handle.

* * * * *